(12) United States Patent
Hwang et al.

(10) Patent No.: US 9,857,927 B2
(45) Date of Patent: Jan. 2, 2018

(54) TRANSPARENT RESIN LAMINATE AND TOUCH SCREEN PANEL INCLUDING THE SAME

(71) Applicant: LG Hausys, Ltd., Seoul (KR)

(72) Inventors: Deok Ryul Hwang, Seoul (KR); Ku Il Park, Yongin-si (KR); Seong Hoon Yue, Seongnam-si (KR); Jong Hun Lee, Seongnam-si (KR); Min Hee Lee, Gunpo-si (KR); Chang Hak Shin, Seoul (KR); Hwan Seok Park, Seoul (KR); Yea Ri Song, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 213 days.

(21) Appl. No.: 14/759,649

(22) PCT Filed: Nov. 12, 2013

(86) PCT No.: PCT/KR2013/010225
§ 371 (c)(1),
(2) Date: Jul. 7, 2015

(87) PCT Pub. No.: WO2014/109471
PCT Pub. Date: Jul. 17, 2014

(65) Prior Publication Data
US 2015/0346872 A1     Dec. 3, 2015

(30) Foreign Application Priority Data

Jan. 9, 2013   (KR) .................. 10-2013-0002620

(51) Int. Cl.
| | | |
|---|---|---|
| *G06F 3/044* | (2006.01) | |
| *G06F 3/041* | (2006.01) | |
| *C08J 7/04* | (2006.01) | |

(52) U.S. Cl.
CPC .............. *G06F 3/044* (2013.01); *C08J 7/042* (2013.01); *G06F 3/041* (2013.01);
(Continued)

(58) Field of Classification Search
CPC .... C08J 2333/12; C08J 2433/08; C08J 7/042; G06F 3/041; G06F 3/044;
(Continued)

(56) References Cited

U.S. PATENT DOCUMENTS

2004/0091643 A1*  5/2004  Nair ...................... G02B 1/105
                                                      428/1.33
2005/0142362 A1*  6/2005  Inaoka ...................... C08J 3/28
                                                      428/411.1
(Continued)

FOREIGN PATENT DOCUMENTS

| JP | 2003-151356 A | 5/2003 |
| JP | 2006-193596 A | 7/2006 |

(Continued)

OTHER PUBLICATIONS

International Search Report for PCT/KR2013/010225 dated Feb. 17, 2014.
(Continued)

*Primary Examiner* — Thao T Tran
(74) *Attorney, Agent, or Firm* — Hauptman Ham, LLP

(57) ABSTRACT

A transparent resin laminate includes: a high-hardness hard coating layer having a pencil hardness of 6H to 8H; a transparent (meth)acrylic resin layer; and an impact resistant hard coating layer including a urethane bond-containing acrylic resin.

15 Claims, 1 Drawing Sheet

(52) U.S. Cl.
CPC ........ *C08J 2333/12* (2013.01); *C08J 2433/08* (2013.01); *Y10T 428/2495* (2015.01); *Y10T 428/24983* (2015.01); *Y10T 428/265* (2015.01); *Y10T 428/269* (2015.01); *Y10T 428/31511* (2015.04); *Y10T 428/31576* (2015.04)

(58) Field of Classification Search
CPC ....... Y10T 428/2495; Y10T 428/24983; Y10T 428/265; Y10T 428/269; Y10T 428/31511; Y10T 428/31576; Y10T 428/31551
USPC ............................................ 428/423.1, 424.4
See application file for complete search history.

(56) References Cited

U.S. PATENT DOCUMENTS

| | | | | |
|---|---|---|---|---|
| 2009/0002820 | A1* | 1/2009 | Okano | G02B 1/105 359/483.01 |
| 2009/0169896 | A1 | 7/2009 | Sohn et al. | |
| 2014/0078422 | A1* | 3/2014 | Tanabe | B32B 7/02 349/12 |

FOREIGN PATENT DOCUMENTS

| | | |
|---|---|---|
| JP | 2007-030307 A | 2/2007 |
| JP | 2007-056180 A | 3/2007 |
| JP | 2012-230666 A | 11/2012 |
| JP | 2012229405 A | 11/2012 |
| KR | 1020080061703 A | 7/2008 |
| KR | 100884079 B1 | 2/2009 |
| KR | 1020110021916 A | 3/2011 |
| KR | 1020110082352 A | 7/2011 |
| WO | 0020517 A2 | 4/2000 |
| WO | 2012/070887 A2 | 5/2012 |

OTHER PUBLICATIONS

Japanese Office Action dated Aug. 22, 2017 corresponding to Japanese Application No. 2015-552565, citing the above reference(s).

* cited by examiner

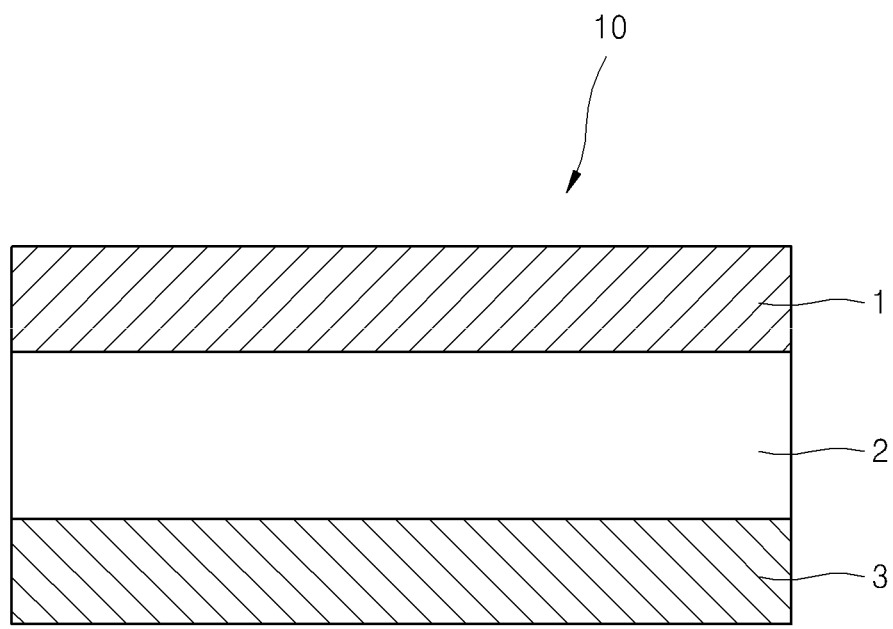

TRANSPARENT RESIN LAMINATE AND TOUCH SCREEN PANEL INCLUDING THE SAME

TECHNICAL FIELD

The present invention relates to a transparent resin laminate and a touch screen panel including the same.

BACKGROUND ART

A glass substrate used in an outermost layer of a cell phone, a tablet PC or a navigation device has various advantages such as a small coefficient of linear expansion, excellent gas barrier property, high light transmissivity, surface flatness, excellent heat resistance, chemical resistance, etc. However, a glass substrate has disadvantages in that it is vulnerable to impacts to be easily broken, and is heavy due to high density.

In accordance with recently increased interests in a liquid crystal display or an organic light emitting diode display, a flexible display, an electronic paper, research into a technology of substituting these glass substrates with plastic substrates has been ongoing.

Incidentally, a methacrylate-based resin is one of the most widely used transparent resins due to excellent transparency and processability, excellent balance in mechanical physical properties, and lower price as compared to a polycarbonate resin. However, the use of the methacrylate-based resin has not been employed in elements of a display such as a light guide plate, a diffusion plate, etc., or in elements especially requiring heat resistance such as a lighting apparatus, an optical lens, etc.

DISCLOSURE

Technical Problem

An aspect of the present invention is to provide a transparent resin laminate having improved high-hardness and impact resistance properties.

Another aspect of the present invention is to provide a touch screen panel employing the transparent resin laminate.

Technical Solution

In accordance with one aspect of the present invention, a transparent resin laminate sequentially includes: a high-hardness hard coating layer having a pencil hardness of 6H to 8H; a transparent (meth)acrylic resin layer; and an impact resistant hard coating layer including a urethane bond-containing acrylic resin.

The impact resistant hard coating layer may include the urethane bond-containing acrylic resin formed by heat-curing a hydroxyl group-containing acrylic monomer with a polyisocyanate oligomer having a weight average molecular weight of approximately 1,000 to 15,000.

The polyisocyanate oligomer may be an isophorone-based polyisocyanate oligomer.

The urethane bond-containing acrylic resin may be formed by heat-curing approximately 70 wt % to 95 wt % of a total of the hydroxyl group-containing acrylic monomer and an acrylic monomer with approximately 5 wt % to 30 wt % of the polyisocyanate oligomer.

The impact resistant hard coating layer may be formed by photo-curing the urethane bond-containing acrylic resin having an acrylic double bond at an end as being tri-functional or tetra-functional.

The impact resistant hard coating layer may have a pencil hardness of 4H to 5H.

A ratio of a thickness of the high-hardness hard coating layer to a thickness of the impact resistant hard coating layer may range from approximately 1:1.2 to 1:1.5.

The high-hardness hard coating layer may have a thickness of approximately 5 µm to 12 µm.

The transparent (meth)acrylic resin layer may have a thickness of approximately 0.5 mm to 1.5 mm.

The impact resistant hard coating layer may have a thickness of approximately 7 µm to 16 µm.

The high-hardness hard coating layer may include at least one selected from a group consisting of an acrylic compound, an epoxy compound, a silicon compound and a combination thereof.

The transparent (meth)acrylic resin layer may include a polymethylmethacrylate resin.

A light transmissivity of the transparent resin laminate may range from approximately 90% to 100%.

In accordance with another aspect of the present invention, there is provided a touch screen panel including the transparent resin laminate as described above as a cover sheet, wherein the high-hardness hard coating layer is stacked so as to face the outside.

In the touch screen panel, a conductive plastic film with a conductive layer formed on one surface, an adhesive film, and the transparent resin laminate may be sequentially stacked.

The transparent resin laminate may be stacked in a direction in which the adhesive film and the impact resistant hard coating layer contact with each other.

The conductive plastic film may be a transparent plastic film with an indium tin oxide (ITO) electrode layer formed on one surface.

Advantageous Effects

In the transparent resin laminate according to the present invention, high-hardness as well as excellent impact resistance properties are achieved, and warpage property is improved.

DESCRIPTION OF DRAWINGS

FIG. 1 is a cross-sectional view of a transparent resin laminate according to an embodiment of the invention.

BEST MODE

In the following detailed description, reference is made to the accompanying drawings that show, by way of illustration, specific embodiments in which the invention may be practiced. These embodiments are described in sufficient detail to enable those skilled in the art to practice the invention. It is to be understood that the example embodiments are not limiting and the present invention may be implemented in different ways.

For the sake of clarity, some details are omitted. Like numerals refer to the same or similar functionality throughout the drawings.

In the drawings, layers and regions are enlarged for clarity. In addition, the thickness of some layers and regions are exaggerated for convenience of illustration.

As used herein, a phrase "an element A on (or under) an element B" refers to that the element A may be disposed directly on (or under) the element B and/or the element A may be disposed indirectly on (or under) the element B via another element C.

FIG. 1 is a cross-sectional view of a transparent resin laminate 10 according to an embodiment of the invention sequentially including: a high-hardness hard coating layer 1 having a pencil hardness of approximately 6H to 8H; a transparent (meth)acrylic resin layer 2; and an impact resistant hard coating layer 3 including a urethane bond-containing acrylic resin.

The transparent resin laminate 10 may replace a glass of a touch screen panel for display. For example, the touch screen panel for display may be a capacitive touch panel, and may be formed with a multilayer of laminated sheets including the conductive plastic film, commonly with a glass substrate such as a tempered glass in the outermost layer. The transparent resin laminate 10 may replace the glass substrate of such a touch screen panel for display.

In the touch screen panel for display, the transparent resin laminate 10 is stacked with the high-hardness hard coating layer 1 on the top, thereby implementing a touch screen panel for display capable of maintaining high surface hardness, while exhibiting good impact resistance.

The transparent resin laminate 10 is advantageous in that plastic having excellent optical performance, being light, and having excellent impact resistance is applied so as to be used as a substitute for the glass substrate of the touch screen panel for display, thereby providing flexibility in design and being mass-produced.

The transparent (meth)acrylic resin layer 2 is a layer made mainly of an optically isotropic acrylic resin, such as a polymethylmethacrylate resin having excellent light transmissivity.

The high-hardness hard coating layer 1 may be formed on one surface (that is, an upper surface) of the transparent (meth)acrylic resin layer 2 to provide high-hardness physical property having a pencil hardness of approximately 6H to 8H as described above. The high-hardness hard coating layer 1 may include an organic compound or an organic-inorganic complex, in which the organic compound may include an acrylic compound, an epoxy compound, or combinations thereof, and the organic-inorganic complex may include a silicon compound such as polysilsesquioxane or silica gel.

For the transparent resin laminate 10, the high-hardness property is obtained by the high-hardness hard coating layer 1 and the transparent (meth)acrylic resin layer 2. Further, impact resistance is reinforced by stacking the impact resistant hard coating layer 3 on the transparent (meth)acrylic resin layer 2.

Specifically, the impact resistant hard coating layer 3 may be a layer made mainly of the urethane bond-containing acrylic resin, the urethane bond-containing acrylic resin being formed by heat-curing a hydroxyl group-containing acrylic monomer with a polyisocyanate oligomer. At the time of heat-curing a mixture of the hydroxyl group-containing acrylic monomer and polyisocyanate oligomer, a hydroxyl group of the hydroxyl group-containing acrylic monomer and an isocyanate group of the polyisocyanate oligomer react with each other to be cross-linked while forming an urethane bond, to give the urethane bond-containing acrylic resin.

More specifically, the polyisocyanate oligomer may be an isophorone-based polyisocyanate oligomer, and may have an acrylic group as an end group.

The polyisocyanate oligomer may have a weight average molecular weight of approximately 1,000 to 15,000. By using the polyisocyanate oligomer having the above-described range of weight average molecular weight, the impact resistant hard coating layer 3 may have excellent impact resistance property, and coating may be uniformly performed in view of a process.

Specifically, the urethane bond-containing acrylic resin may include a urethane bond-containing acrylic resin formed by heat-curing approximately 70 to 95 wt % of a total of the hydroxyl group-containing acrylic monomer and an acrylic monomer with approximately 5 to 30 wt % of the polyisocyanate oligomer.

In one embodiment, the urethane bond-containing acrylic resin may have an acrylic double bond at an end as being tri-functional or tetra-functional.

The impact resistant hard coating layer 3 may be formed by photo-curing the urethane bond-containing acrylic resin. The impact resistant hard coating layer 3 formed of the urethane bond-containing acrylic resin as a main material as described above may provide excellent impact resistance property.

For example, when a composition including the above-described urethane bond-containing acrylic resin is applied on one surface (that is, a lower surface) of the transparent (meth)acrylic resin layer 2, and then is photo-cured, the hard coating layer is formed by a photo-curing reaction of the double bond at the end of the urethane bond-containing acrylic resin.

In addition, the impact resistant hard coating layer 3 may also be a hard coating layer and may have a hardness above a predetermined level. Specifically, the impact resistant hard coating layer may have a pencil hardness of approximately 4H to 5H.

A ratio of the thickness of the high-hardness hard coating layer 1 to the thickness of the impact resistant hard coating layer 3 may range from approximately 1:1.2 to 1:1.5. When the transparent resin laminate has a thickness ratio in the above-described range, durability including excellent hardness and impact resistance may be achieved while suppressing warpage and curl which may occur during the process.

The high-hardness hard coating layer 1 may have a thickness of approximately 5 μm to 12 μm. When the high-hardness hard coating layer 1 has a thickness in the above-described range, durability including excellent hardness and impact resistance may be achieved while suppressing warpage and curl.

The transparent (meth)acrylic resin layer 2 may have a thickness of approximately 0.5 mm to 1.5 mm. When the transparent (meth)acrylic resin layer 2 has a thickness in the above-described range, durability including excellent hardness and impact resistance may be achieved while suppressing warpage and curl.

The impact resistant hard coating layer 3 may have a thickness of approximately 7 μm to 16 μm. When the impact resistant hard coating layer 3 has a thickness in the above-described range, durability including excellent hardness and impact resistance may be achieved while suppressing warpage and curl.

Each of the layers of the transparent resin laminate may be transparent as they are composed of the above-described components. Specifically, a light transmissivity of the transparent resin laminate may be 90% to 100%.

In another embodiment of the present invention, there is provided a touch screen panel including the transparent resin laminate as a cover sheet. In the touch screen panel, the high-hardness hard coating layer of the transparent resin laminate is stacked so as to face the outside.

Detailed description of the transparent resin laminate has been made above; and therefore, will not be repeated.

The touch screen panel may be a multilayer sheet in which a conductive plastic film with a conductive layer formed on one surface, an adhesive film, and the transparent resin laminate are sequentially stacked. That is, the touch screen panel may be a multilayer sheet in which the transparent resin laminate is stacked on the conductive plastic film via the adhesive film.

Here, the transparent resin laminate may be stacked in a direction in which the adhesive film and the impact resistant hard coating layer contact with each other.

Types of the conductive plastic film are not particularly limited herein, and any known conductive plastic films may be used. For example, the conductive plastic film may be a transparent plastic film with an indium tin oxide (ITO) electrode layer formed on one surface. Specifically, the transparent plastic film may include, but is not limited to, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, a polyimide film, etc. More specifically, the transparent plastic film may be a polyethylene terephthalate (PET) film.

The adhesive film may be used with known compositions so as to be formed as an optically clear adhesive layer (OCA). Specifically, the adhesive film may be formed by photo-curing or by heat-curing an adhesive composition including a monomer selected from the group consisting of 2-ethyl hexyl acrylate (2-EHA), isobornyl acrylate (IBOA), hydroxyl ethyl acrylate (HEA), hydroxyl butyl acrylate (HBA), hydroxyl propyl acrylate (HPA), hexyl methacrylate (HMA), and the like, or combinations thereof, a photoinitiator, a curing agent, other additives, etc. The photo-curing includes UV light irradiation.

Hereinafter, Examples and Comparative Examples of the present invention will be described. However, the following examples are only provided as one embodiment of the present invention, and the present invention is not limited to the following Examples.

EXAMPLE

Preparation Example 1

A composition for forming a high-hardness hard coating layer was prepared by mixing 2-hydroxyethyl acrylate (HEA), isobornyl acrylate (IBoA), and pentaerythritol triacrylate (PETA).

Preparation Example 2

First, a polyisocyanate-based macro oligomer (a weight average molecular weight of approximately 5,000) having an acrylic group as an end group was prepared from isophorone diisocyanate (IPDI), 2-hydroxyethyl acrylate (HEA) as starting materials.

Then, 100 parts by weight of a monomer mixture of hydroxyethyl acrylate and isobornyl acrylate was prepared, and 4 parts by weight of 1-hydroxy cydohexyl phenyl ketone (Irgacure 184, HCPK) as a photoinitiator was mixed therewith. Then, a mixed solvent of ethanol, isobutanol, methoxyethanol, methyl isobutyl ketone (MIBK) and N-butyl acetate was added to prepare a mixed composition, and 25 parts by weight of the above-prepared polyisocyanate-based macro oligomer was mixed with the mixed composition to prepare a composition for forming an impact resistant hard coating layer.

Example 1

The composition for forming a high-hardness hard coating layer prepared in Preparation Example 1 was coated and dried on one surface of a transparent sheet of a polymethylmethacrylate resin having a thickness of 1.0 mm by using a UV curing method so as to have a thickness of 9 µm, thereby forming a high-hardness hard coating layer. Then, the composition for forming an impact resistant hard coating layer prepared in Preparation Example 2 was coated and dried on the other surface of the transparent sheet of the (meth)acrylic resin by using a UV curing method so as to have a thickness of 13 µm, to thereby form an impact resistant hard coating layer, thereby manufacturing a transparent resin laminate.

Example 2

A transparent resin laminate was manufactured by the same method as Example 1 except for only changing respective thicknesses of the high-hardness hard coating layer and the impact resistant hard coating layer to be 5 µm and 7 µm.

Comparative Example 1

A composition for forming a high-hardness hard coating layer was prepared by mixing 2-hydroxyethyl acrylate (HEA), isobornyl acrylate (IBoA), and pentaerythritol triacrylate (PETA). The same coating liquid was coated on both surfaces of a transparent sheet of the polymethylmethacrylate resin having a thickness of 1.0 mm so as to have the same thickness (respective thicknesses are 9 µm and 9 µm), thereby manufacturing a transparent resin laminate.

Comparative Example 2

A composition for forming a high-hardness hard coating layer was prepared by mixing 2-hydroxyethyl acrylate (HEA), isobornyl acrylate (IBoA), and pentaerythritol triacrylate (PETA). The same coating liquid was coated at the same thickness (9 µm/9 µm, respectively) onto both surfaces of a polycarbonate sheet having a thickness of 1.0 mm, thereby manufacturing a transparent resin laminate.

Evaluation (Transmissivity and Haze)

Transmissivity and haze of each transparent resin laminate of Examples 1 and 2, and Comparative Examples 1 and 2 were measured in accordance with transmissivity: JIS K7361-1, haze: JIS K7105, and results thereof were shown in Table 1 below.

(Surface Hardness)

The measurement method was conducted according to JISK5600-5-4, and pencil hardness was measured by using Mitsubishi pencils. (Seventeen Mitsubishi pencils having pencil hardness in the range of 6B to 9H were tested with an electric pencil hardness tester having load adjustment of 1 kg.)

(Falling Dart Impact)

Measurement method was as follows: the transparent resin laminate of each of Examples 1 and 2, and Comparative Examples 1 and 2 was fixed to a hydraulic press jig, and a 36 g brass dart having a diameter of 20.7 mm was dropped onto the transparent resin laminate. A height at which a crack completely penetrates the transparent resin laminate was measured. A crack which simply leaves a point-like mark was ignored. A sufficient space was obtained between the transparent resin laminate and the ground so that the transparent resin laminate did not reach the ground even after the brass dart was dropped onto it.

(Warpage Property Evaluation)

Measurement method was as follows: the transparent resin laminate of each of Examples 1 and 2, and Comparative Examples 1 and 2 was prepared as a sample having a size of 60 mm×100 mm and positioned on the ground. Then, a thickness from the bottom surface at a specific position was measured (measurement apparatus: LK-G35 by KEYENCE Corporation) and determined as a reference value, and thicknesses from the bottom surface at other six positions were measured. The largest difference from the reference value was evaluated as a warpage, and results thereof were shown in Table 1 below:

TABLE 1

| Classification | Example 1 | Example 2 | Comparative Example 1 | Comparative Example 2 |
|---|---|---|---|---|
| Transmissivity | 93.7 | 93.3 | 93.6 | 89.9 |
| Haze | 0.15 | 0.15 | 0.12 | 0.25 |
| Surface Hardness | 6~7H | 6H | 7H | H |
| Falling Dart Impact Evaluation (36 g/d = 20.7 mm/break) | 40 cm | 30 cm | 23 cm | 50 cm or more |
| Warpage Property (4.5 inch/85° C./Relative Humidity of 85%) | 0.1 mm | 0.1 mm | 0.2 mm | 0.2 mm |

As can be seen from Table 1 above, as a result of the falling dart impact evaluation, the transparent resin laminate of Example 1 exhibited significantly excellent impact resistance as compared to the transparent resin laminate of Comparative Example 1. Further it can be seen that it is difficult to achieve high hardness with the transparent resin laminate of Comparative Example 2 which is made of polycarbonate resin.

DESCRIPTION OF MAIN ELEMENTS

1: HIGH-HARDNESS HARD COATING LAYER
2: TRANSPARENT (METH)ACRYLIC RESIN LAYER
3: IMPACT RESISTANT HARD COATING LAYER
10: TRANSPARENT RESIN LAMINATE

The invention claimed is:

1. A transparent resin laminate, sequentially comprising:
a high-hardness hard coating layer having a pencil hardness of 6H to 8H;
a transparent (meth)acrylic resin layer; and
an impact resistant hard coating layer comprising a urethane bond-containing acrylic resin,
wherein the urethane bond-containing acrylic resin is formed by heat-curing a mixture comprising a hydroxyl group-containing acrylic monomer and a polyisocyanate oligomer having a weight average molecular weight of 1,000 to 15,000, and
wherein the mixture comprises 70 wt % to 95 wt % of the hydroxyl group-containing acrylic monomer, and 5 wt % to 30 wt % of the polyisocyanate oligomer.

2. The transparent resin laminate according to claim 1, wherein the polyisocyanate oligomer is an isophorone-based polyisocyanate oligomer.

3. The transparent resin laminate according to claim 1, wherein the impact resistant hard coating layer is formed by photo-curing the urethane bond-containing acrylic resin having an acrylic double bond at an end as being tri-functional or tetra-functional.

4. The transparent resin laminate according to claim 1, wherein the impact resistant hard coating layer has a pencil hardness of 4H to 5H.

5. The transparent resin laminate according to claim 1, wherein a ratio of a thickness of the high-hardness hard coating layer to a thickness of the impact resistant hard coating layer ranges from 1:1.2 to 1:1.5.

6. The transparent resin laminate according to claim 1, wherein the high-hardness hard coating layer has a thickness of 5 μm to 12 μm.

7. The transparent resin laminate according to claim 1, wherein the transparent (meth)acrylic resin layer has a thickness of 0.5 mm to 1.5 mm.

8. The transparent resin laminate according to claim 1, wherein the impact resistant hard coating layer has a thickness of 7 μm to 16 μm.

9. The transparent resin laminate according to claim 1, wherein the high-hardness hard coating layer comprises at least one selected from a group consisting of an acrylic compound, an epoxy compound, a silicon compound and a combination thereof.

10. The transparent resin laminate according to claim 1, wherein the transparent (meth)acrylic resin layer comprises a polymethylmethacrylate resin.

11. The transparent resin laminate according to claim 1, wherein a light transmissivity of the transparent resin laminate ranges from 90% to 100%.

12. A touch screen panel comprising the transparent resin laminate according to claim 1 as a cover sheet,
wherein the high-hardness hard coating layer is stacked so as to face the outside.

13. The touch screen panel according to claim 12, wherein a conductive plastic film with a conductive layer formed on one surface, an adhesive film, and the transparent resin laminate are sequentially stacked.

14. The touch screen panel according to claim 13, wherein the transparent resin laminate is stacked in a direction in which the adhesive film and the impact resistant hard coating layer contact with each other.

15. The touch screen panel according to claim 13, wherein the conductive plastic film is a transparent plastic film with an indium tin oxide (ITO) electrode layer formed on one surface.

* * * * *